United States Patent
Okuyama et al.

(10) Patent No.: US 6,665,043 B1
(45) Date of Patent: Dec. 16, 2003

(54) BONDING METHOD AND BONDING DEVICE OF SUBSTRATES AND MANUFACTURING METHOD OF A LIQUID CRYSTAL DISPLAY DEVICE

(75) Inventors: Motohiro Okuyama, Watarai-gun (JP); Nobuhiro Waka, Matsusaka (JP); Masayuki Tsuji, Matsusaka (JP); Michio Hori, Matsusaka (JP); Yuji Fukushima, Nara (JP); Kazuyuki Tamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 310 days.

(21) Appl. No.: 09/643,691

(22) Filed: Aug. 22, 2000

(30) Foreign Application Priority Data

Aug. 31, 1999 (JP) .......................... 11-245382

(51) Int. Cl.$^7$ ............................. G02F 1/1341
(52) U.S. Cl. ....................... 349/187; 349/190
(58) Field of Search ................ 349/187, 189, 349/190

(56) References Cited

U.S. PATENT DOCUMENTS 6,036,568 A * 3/2000 Murouchi et al. ............ 445/25

FOREIGN PATENT DOCUMENTS

| JP | 63-155021 | 6/1988 | |
| JP | 64-061729 | 3/1989 | G02F/1/133 |
| JP | 6-34983 | 2/1994 | G02F/1/1339 |
| JP | 7-065925 | 3/1995 | H01R/43/00 |
| JP | 08-110504 | 4/1996 | G02F/1/13 |
| JP | 09-160050 | 6/1997 | G02F/1/1339 |
| JP | 10-274946 | 10/1998 | G09F/9/35 |
| JP | 11-95181 | 4/1999 | |

OTHER PUBLICATIONS

Copy of Japanese Office Action and English Transaction.

* cited by examiner

Primary Examiner—Robert H. Kim
Assistant Examiner—Hoan Nguyen
(74) Attorney, Agent, or Firm—Edwards & Angell, LLP; David G. Conlin; Lisa Swiszcz Hazzard

(57) ABSTRACT

A substrate bonding method in which a pair of masks which were prepared by forming a recessed section at a center part of each flat plate are placed on upper and lower stages, respectively, so that the recessed sections face a CF substrate and a TFT substrate, the CF substrate and TFT substrate are positioned one upon another and bonded together by sandwiching them between the masks. With this method, not only the CF substrate and TFT substrate are protected by the recessed sections from both sides, but also the dimensions of a region of each of the CF substrate and TFT substrate protected by the recessed sections are easily changed by replacing the masks. It is thus possible to provide a substrate bonding method that can readily meet the manufacture of bonded substrates of a variety of dimensions.

36 Claims, 11 Drawing Sheets

BONDING METHOD AND BONDING DEVICE OF SUBSTRATES AND MANUFACTURING METHOD OF A LIQUID CRYSTAL DISPLAY DEVICE

FIELD OF THE INVENTION

The present invention relates to a bonding method and bonding device of substrates and a manufacturing method of a liquid crystal display device, and more particularly to a bonding method and bonding device for bonding a pair of substrates together by placing the substrates one upon another and sandwiching the substrates between a pair of mutually facing surface plates, and a method of manufacturing a liquid crystal display device by introducing liquid crystals into the space between a pair of substrates after bonding the substrates.

BACKGROUND OF THE INVENTION

Conventionally, a substrate bonding method for bonding a pair of substrates together by placing the substrates one upon another and sandwiching the substrates between a pair of mutually facing surface plates has been used for the manufacture of various products.

For instance, according to a typical manufacturing method of a liquid crystal display device, a wiring layer, pixel electrodes, active elements and color filter are suitably formed on the inner surface of each of two pieces of glass substrates and coated with an alignment film or the like to provide two pieces of composite substrates. Next, these composite substrates are bonded together with a seal material therebetween by sandwiching them between a pair of mutually facing surface plates. Finally, liquid crystals are introduced between the two pieces of composite substrates to provide a liquid crystal display device.

For example, Tokukaihei No. 11-95181 (Japanese laid-open patent publication; published on Apr. 9, 1999) specifically explains a substrate bonding method for use in a manufacturing method of a liquid crystal display device. More specifically, as shown in FIG. 10 (corresponding to FIG. 1 of the above publication), in the step of bonding an element substrate 120 and a counter substrate 130 together, the counter substrate 130 is pressed from an upward direction by a bonding head 115 so as to stick to the element substrate 120 with a seal material (not shown) therebetween.

A rigid base plate 113 is positioned under the element substrate 120, and provided with a recessed section 113a formed at the center part thereof. An outer edge of the recessed section 113a is located in the vicinity of an outer edge section of a liquid crystal display area A of the element substrate 120 and counter substrate 130 and on a slightly inner side of the formation area of the seal material (not shown) More precisely, the outer edge of the recessed section 113a is located slightly outside of the outer edge section of the liquid crystal display area A.

A buffer material 114 is placed on the rigid base plate 113. The buffer material 114 is provided with a pierced section 114b having the same shape as the recessed section 113a. The recessed section 113a and pierced section 114b prevent a portion of the outer surface section of the element substrate 120, which is slightly larger than the liquid crystal display area A, from coming into contact with the base plate 113 and buffer material 114. Therefore, even if broken pieces and dusts are present between the element substrate 120 and the base plate 113, it is possible to prevent the outer surface of the element substrate 120 in the liquid crystal display area A from been scratched.

Besides, there is a method in which a non-contact section is provided by forming a pierced section 117b (or recessed section) in the buffer material 117 as shown in FIG. 11 (corresponding to FIG. 3 of Japanese laid-open patent publication (Tokukaihei) No. 11-95181) instead of forming the recessed section 113a in the base plate 113.

There is another method in which a recessed section 116b is formed at the center part of a press section 116a of a bonding head 116 as shown in FIG. 11 so as to prevent the outer surface of the counter substrate 130 in the liquid crystal display area A from being scratched. The outer edge of the recessed section 116b is located in the vicinity of the outer edge section of the liquid crystal display area A and on a slightly inner side of the formation area of the seal material (not shown).

However, the above-mentioned substrate bonding methods suffer from the following problems.

First, in either the method using the rigid base plate 113 provided with the recessed section 113b as shown in FIG. 10 (or the base plate 113 provided with the non-contact section) or the method in which the non-contact section is produced by forming the pierced section 114b (or recessed section) in the buffer material 114 as shown in FIG. 11, since the buffer material 114 positioned between the rigid base plate 113 and the element substrate 120 is not secured to either the base plate 113 or the element substrate 120, it tends to be displaced. For this reason, displacement often occurs between the base plate 113 and the buffer material 114 and between the buffer material 114 and the element substrate 120, and thus making it difficult to accurately align the element substrate 120 on the base plate 113. As a result, the distance (gap) between the substrates 120 and 130 is irregular and the alignment accuracy of the substrates 120 and 130 deteriorates. In actual fact, for such non-uniformity and instability of the distance between the substrates 120 and 130 and deterioration of the alignment accuracy, it is extremely difficult to mass-produce a liquid crystal display device while accurately keeping a slight and uniform distance (a cell gap of around a few $\mu$m) between the substrates 120 and 130 over the entire surface of the substrates 120 and 130 in a stable manner.

Moreover, since the buffer material 114 is formed of a pile of thick paper, it has a low strength and low reliability (durability) fore repeated use. For this reason, when such a buffer material 114 formed of such a pile of thick paper is used repeatedly to bond the substrates for the mass-production of a liquid crystal display device, a problem arises. In actual fact, it is impossible to use this buffer material 114 in this manner. Furthermore, since the buffer material 114 is formed of a pile of thick paper, even if it is made stick to the base plate 113 by vacuum suction, it is difficult to completely secure the buffer material 114 to the base plate 113, and the buffer material 114 tends to be displaced. This causes non-uniformity of the gap between the substrates 120 and 130 and deterioration of the alignment accuracy of the substrates 120 and 130.

Additionally, a method using the rigid base plate 113 provided with the recessed section 113b as shown in FIG. 10 (or the base plate 113 provided with the non-contact section) suffers from the following problem. Specifically, whenever the dimensions of a liquid crystal display device to be manufactured are changed, it is necessary to replace not only the buffer material 114 with the one having a pierced section 114b corresponding to the changed dimensions of the liquid crystal display device, but also the base plate 113 with the one having a recessed section 113b corresponding to the changed dimensions of the liquid crystal display device. For this reason, this method can not readily meet liquid crystal display devices of a variety of dimensions.

Besides, the above-mentioned publication discloses a modified example of the structure shown in FIG. 11, in which a buffer material having a recessed section is made stick to a press surface 116a of a bonding head 116 having a recessed section 116b. However, this publication does not mention sticking the buffer material having a recessed section to a flat press surface 116a. Therefore, whenever the dimensions of a liquid crystal display device to be manufactured are changed, it is also necessary to replace the bonding head 116 with the one having a recessed section 116b corresponding to the dimensions of the liquid crystal display device. For this reason, this method can not readily meet liquid crystal display devices of a variety of dimensions.

SUMMARY OF THE INVENTION

An object of the present invention is to provide a substrate bonding method that can readily meet the manufacture of bonded substrates of a variety of dimensions.

In order to achieve the above object, a substrate bonding method of the present invention includes:

placing a pair of masks, which were prepared by forming a recessed section at a center part of each flat plate, on a pair of mutually facing surface plates so that the recessed sections of the masks face each other; and sandwiching the pair of substrates positioned one upon another between the surface plates with the masks therebetween so as to bond the substrates together.

Moreover, the substrate bonding method of the present invention may place a mask, which was prepared by forming a recessed section at a center part of a flat plate and a protruding section in the recessed section, on at least one of the pair of mutually facing surface plates so that the recessed section of the mask faces the other surface plate, and sandwich the pair of substrates positioned one upon another between the surface plates with the mask therebetween so as to bond the substrates together.

Furthermore, the substrate bonding method of the present invention may place a mask, which was prepared by forming a recessed section at a center part of a flat plate and through-holes at parts other than the recessed section, on at least one of the pair of mutually facing surface plates so that the recessed section of the mask faces the other surface plate, stick and secure the substrate to the surface plate through the through-holes in the mask by performing vacuum suction from substrate attracting holes formed in the surface plate, and sandwich the pair of substrates positioned one upon another between the surface plates with the mask therebetween so as to bond the substrates together.

According to the above substrate bonding method, since the mask is provided with the recessed section, the surface of the center part of the substrate facing the recessed section of the mask is not in contact with the mask. Therefore, in a region where the recessed section of the mask and the substrate face each other, even if there are broken pieces of the substrate, foreign matter, etc. between the mask and the substrate, the broken pieces of the substrate, foreign matter, etc. come into the recessed section of the mask. Consequently, it is possible to prevent a local pressure due to the broken pieces of the substrate, foreign matter, etc. from being applied to the outer surface of the substrate facing the recessed section of the mask. It is thus possible to prevent the outer surface of the substrate facing the recessed section of the mask from being scratched. In other words, it is possible to protect the outer surface of the substrate from foreign matter, etc. by the recessed section of the mask.

Additionally, in the manufacture of a liquid crystal display device using the bonded substrates, in general, spacers formed of plastic beads are provided on the inner side of the substrate. However, if a local pressure is applied to the outer surface of the substrate, the broken pieces of the substrate, foreign matter, etc. press the substrate against the spacers, and thus the inner surface of the substrate is scratched. However, according to the above-mentioned method, since a local pressure is not applied to the outer surface of the substrate facing the recessed section of the mask, it is also possible to prevent scratches on the inner surface of the substrate in this section.

Therefore, for example, if a liquid crystal display device is manufactured using a portion of the bonded substrates, which is protected by the recessed section of the mask, it is possible to provide a liquid crystal display device having no scratches in a display screen (display area).

Moreover, according to the above-mentioned method, since the contact area of the mask and the substrate surface is reduced, it is possible to decrease the amount of foreign matter, etc. sandwiched between the mask and the substrate.

Furthermore, according to the above-mentioned method, in a region where the substrate and the recessed section of the mask face each other, since foreign matter, etc. are not sandwiched between the outer surface of the substrate and a press surface, the distance (gap) between the substrates can never be decreased locally due to the effects of the sandwiched foreign matter, etc. It is thus possible to keep the distance between the substrates uniform and provide bonded substrates with a uniform gap.

Besides, according to the above-mentioned method, since a pair of masks are placed on the surface plates, respectively, it is possible to prevent both of the substrate surfaces from being scratched and both of the surface plates from being scratched by foreign matter, etc. Additionally, since the dimensions of the recessed section can be changed easily by replacing the mask, this method can readily meet bonded substrates of a variety of dimensions, such as a liquid crystal display device having a liquid crystal display area of a variety of dimensions.

For a fuller understanding of the nature and advantages of the invention, reference should be made to the ensuing detailed description taken in conjunction with the accompanying drawings.

DESCRIPTION OF THE PREFERRED EMBODIMENTS

Comparative Example

Prior to explaining the present invention, a basic technique on which the present invention was found will be explained as a comparative example. This basic technique is a manufacturing method of a liquid crystal display device.

Figure 8:
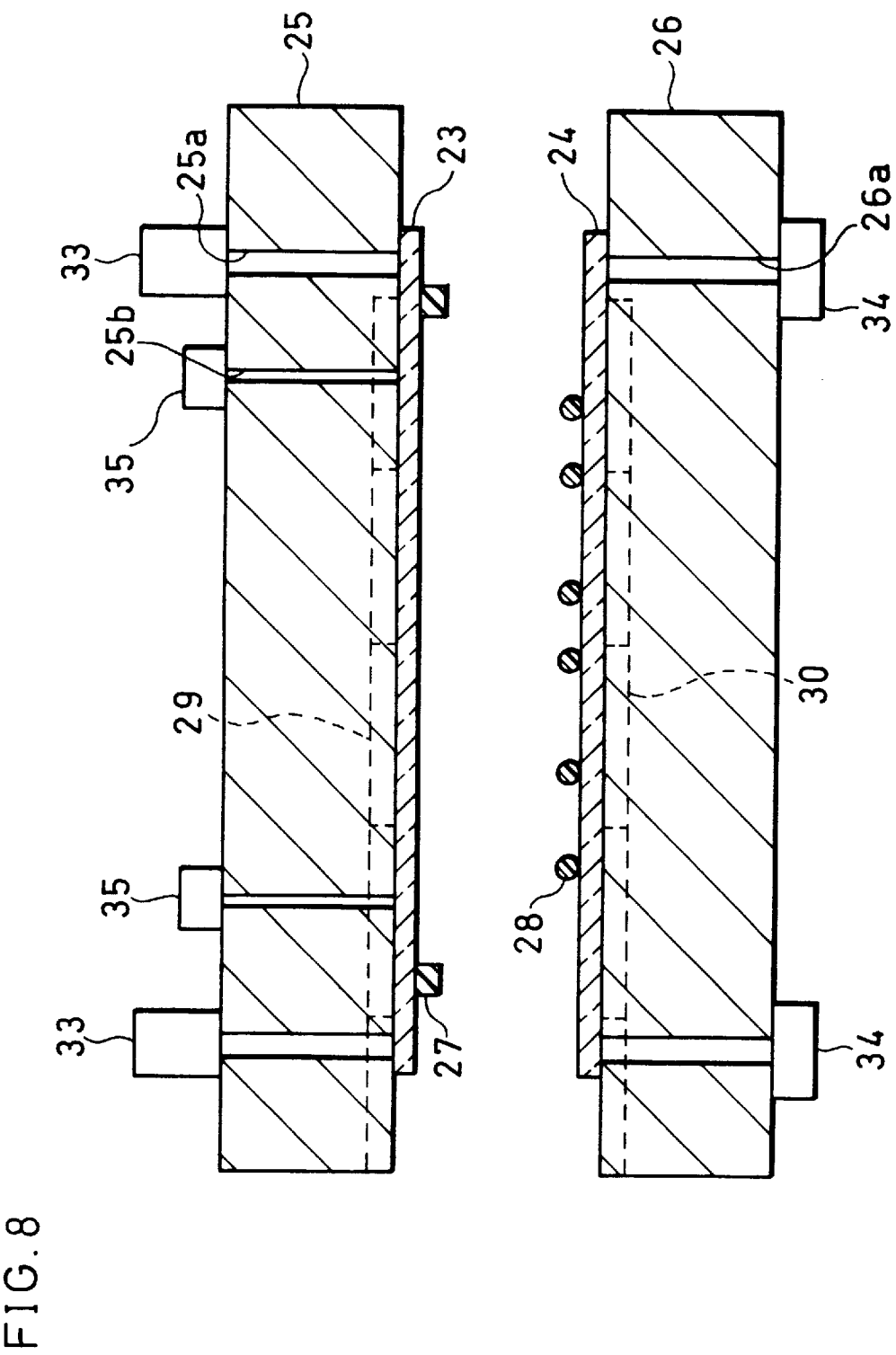
FIG. 8 is a cross sectional view of a substrate bonding device of a comparative example.
Figure 9:
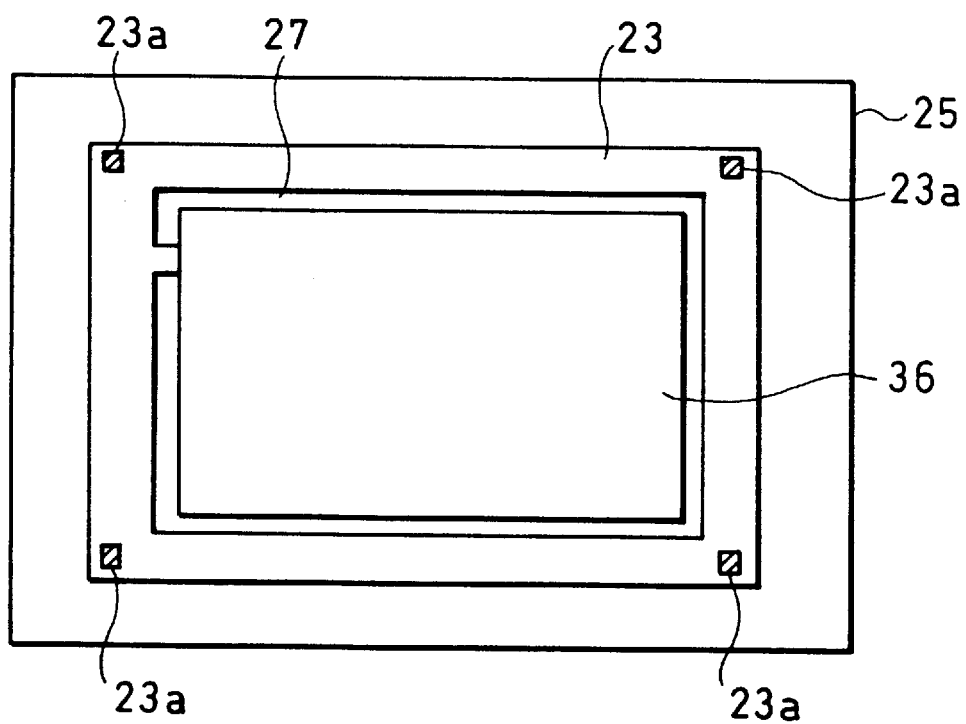
FIG. 9 is a schematic plan view showing how a substrate is secured to an upper stage in the substrate bonding device of the comparative example.
Figure 10:
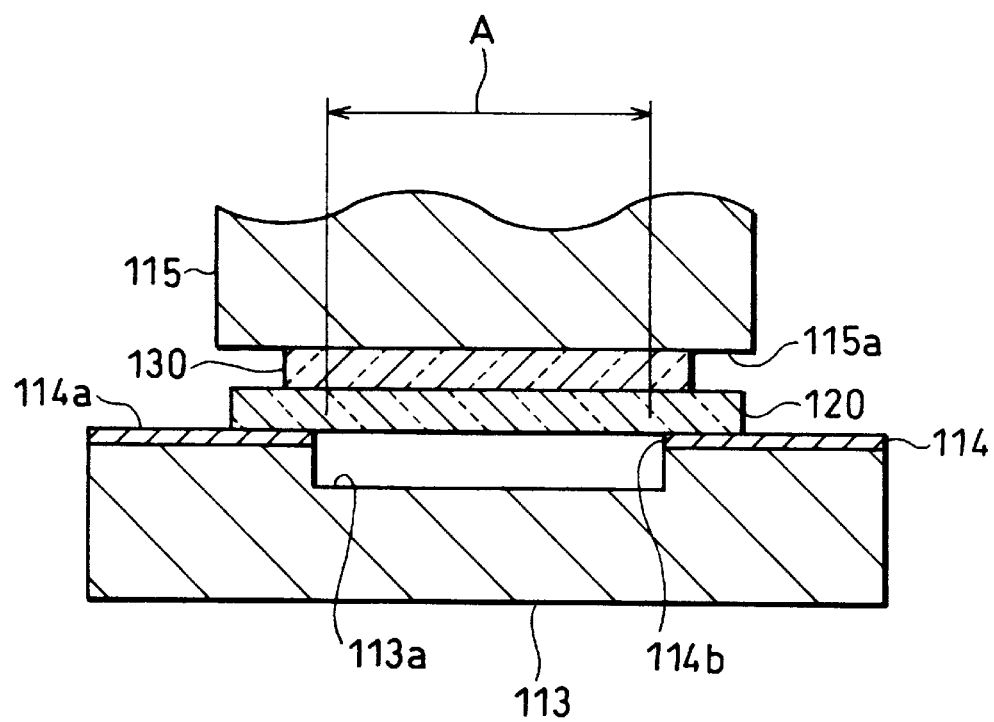
FIG. 10 is a cross sectional view showing one example of a conventional substrate bonding device.
Figure 11:
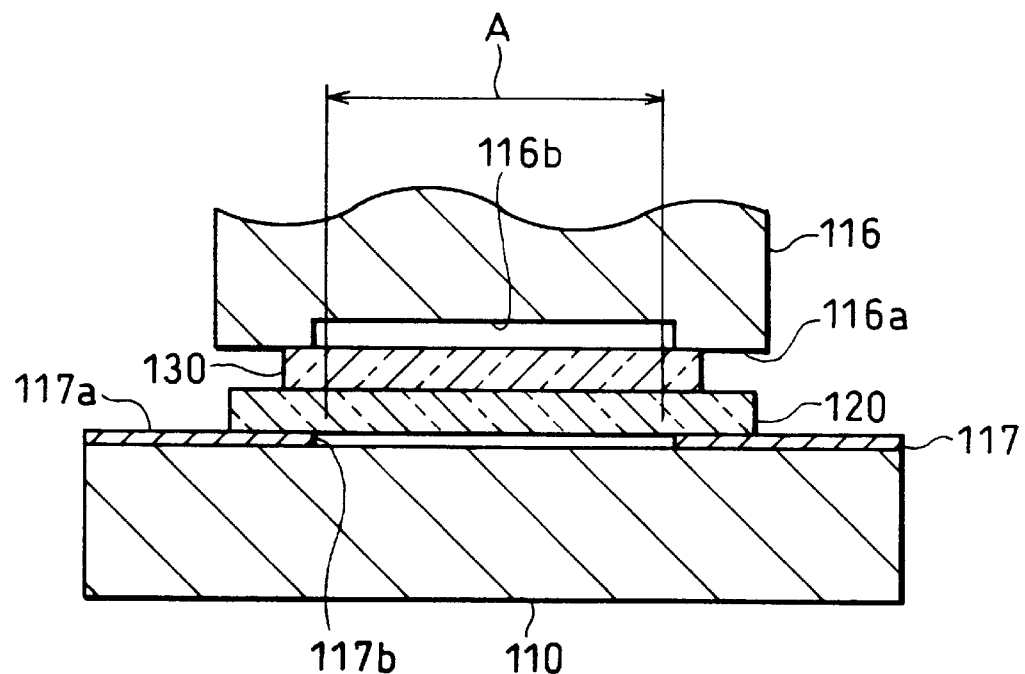
FIG. 11 is a cross sectional view showing another example of a conventional substrate bonding device.

Referring to FIGS. 8 and 9, the following description will explain a bonding device for use in the step of bonding substrates in the manufacturing method of a liquid crystal display device of this comparative example. Here, FIG. 8 is a cross sectional view showing the structure of the bonding device, and FIG. 9 is a plan view showing a state in which a color filter substrate is made stick to an upper stage of the bonding device.

As illustrated in FIG. 8, the bonding device of this comparative example includes an upper stage (surface plate) 25 and a lower stage (surface plate) 26 which are formed of metal, etc. and have mutually facing parallel flat surfaces. With this bonding device, CF (color filter) substrate 23 and TFT (thin film transistor) substrate 24 (hereinafter occasionally referred to as the substrates 23 and 24) are positioned one upon another with a seal material 27 made of a heat-curing type resin and spacers 28 formed of plastic beads therebetween, and sandwiched between the upper stage 25 and the lower stage 26 (hereinafter occasionally referred to as the stages 25 and 26) so as to bond them together by pressure.

Specifically, the CF substrate 23 is fabricated by placing a color filter on a glass substrate and coating the color filter with an alignment film or the like. Meanwhile, the TFT substrate 24 is fabricated by placing a thin film transistor as a liquid crystal drive element, pixel electrodes, etc. on a glass substrate and coating them with an alignment film or the like.

The mutually facing flat surfaces of the upper state 25 and lower stage 26 are provided with a number of substrate attracting holes 29 and 30, respectively. The substrate attracting holes 29 are provided to stick and secure the CF substrate 23 to the upper stage 25 by vacuum suction, and connected to a vacuum suction device such as a vacuum pump (not shown) through a conductor in the upper stage 25. Besides, the substrate attracting holes 30 are provided to stick and secure the TFT substrate 24 to the lower stage 26 by vacuum suction, and connected to a vacuum suction device such as a vacuum pump (not shown) through a conductor in the lower stage 26.

As illustrated in FIG. 9, four alignment marks (alignment-use markers) 23a are provided in the four corners of the CF substrate 23. Moreover, although not shown in the drawings, the TFT substrate 24 is provided with four alignment marks at positions corresponding to the four alignment marks 23a on the CF substrate 23, respectively.

Furthermore, four alignment-use image pickup holes 25a and four alignment-use image pickup holes 26a are formed to pierce the upper stage 25 and lower stage 26, respectively, at positions corresponding to the alignment marks 23a. Four alignment-use cameras 33 (two of them are not shown) are mounted at positions on the upper stage 25 where the image pickup holes 25a are formed. The cameras 33 perform the function of picking up the images of the alignment marks to recognize whether the positions of the four alignment marks 23a on the CF substrate 23 agree with the positions of the four alignment marks on the TFT substrate 24. Besides, the lower stage 26 is provided with four pieces of backlight 34 (two of them are not shown) as light sources used for picking up the images by the cameras 33 during the alignment.

Four ultraviolet irradiation-use holes 25b are formed at predetermined positions in the four corners of the upper stage 25 so as to pierce the upper stage 25. Moreover, four ultraviolet irradiation light sources 35 (two of them are not shown) for irradiating ultraviolet rays to an ultraviolet-curing type resin applied to four positions on the substrates 23 and 24 are mounted at the positions of the upper stage 25 where the ultraviolet irradiation-use holes 25b are formed.

Here, the mount positions of the cameras 33 and backlight 34 may be switched. Furthermore, the ultraviolet irradiation light sources 35 and the ultraviolet irradiation-use holes 25b may be provided on the lower stage 26 instead of the upper stage 25.

Next, the following description will explain a manufacturing method of a liquid crystal display device using the above-mentioned bonding device.

First, before performing the bonding step, the spacers 28 for keeping the cell gap (the distance between the substrates 23 and 24) uniform are spread on the TFT substrate 24. Moreover, the ultraviolet-curing type resin (not shown) for temporarily sticking the substrates 23 and 24 is applied to the predetermined positions in the four corners of the substrates 23 and 24. Furthermore, the seal material 27 is provided the CF substrate 23 by drawing, printing, etc. so as to enclose a liquid crystal display area 36. Incidentally, the seal material 27 and the spacers 28 may be provided on either the CF substrate 23 or the TFT substrate 24.

Subsequently, with the use of the above-mentioned bonding device, the step of bonding the CF substrate 23 and TFT substrate 24 together is performed. More specifically, the substrates 23 and 24 are positioned so that their surfaces coated with the alignment film or the like face each other, and bonded together accurately with the spaces 28 for keeping a uniform cell gap (distance between the substrates 23 and 24) and the seal material 27 for sealing liquid crystals therebetween.

The following description will explain in detail a method of bonding the CF substrate 23 and TFT substrate 24 together.

First, the CF substrate 23 and TFT substrate 24 are made stick to the upper stage 25 and lower stage 26, respectively, by vacuum suction through the substrate attracting holes 29 and 30.

Next, alignment of the substrates 23 and 24 is performed. More specifically, the images of the four alignment marks 23a on the CF substrate 23 and the four alignment marks on the TFT substrate 24 are picked up through the alignment-use image pickup holes 25a in the upper stage 25 by the four cameras 33. Then, alignment of the substrates 23 and 24 is carried out by moving the upper stage 25 or lower stage 26 according to the result of this image pickup so that the alignment marks overlap each other. The movement of the upper stage 25 or lower stage 26 is performed by controlling the X coordinate (the coordinate of the X axis parallel to one side of the substrates 23 and 24) and the Y coordinate (the coordinate of the Y axis that is parallel to the substrates 23 and 24 and perpendicular to the X coordinate) with the use of a (X,Y,θ) drive device (not shown).

Subsequently, the lower stage 26 is moved upward along the Z axis (θaxis) perpendicular to the substrates 23 and 24 so as to bond the substrates 23 and 24 together by pressure so that the gap between the substrates 23 and 24 is closer to the diameter of the spacer 28.

Thereafter, ultraviolet rays are irradiated on the positions between the substrates 23 and 24 where the ultraviolet-curing type resin is applied, by the four ultraviolet irradiation-use light sources 35 through the ultraviolet irradiation-use holes 25b. As a result, the ultraviolet-curing type resin is cured, thereby temporarily sticking (temporarily fastening) the substrates 23 and 24 together.

Thus, the bonding step is the step of temporarily sticking and fastening the substrates 23 and 24 with fixed dimensional accuracy by aligning the substrates 23 and 24 and bonding the substrates 23 and 24 together with the seal material 27 therebetween by the use of the ultraviolet-curing type resin.

After the bonding step, the seal material curing step for curing the seal material 27 by baking is performed. Then, after cutting the bonded substrates 23 and 24 at the position of the seal material 27, liquid crystals are introduced into the space between the bonded substrates 23 and 24 and sealed, thereby providing a liquid crystal display panel (liquid crystal display device).

However, according to this substrate bonding method of the comparative example, the substrates 23 and 24 are bonded together in a state in which the whole surface on one side of each of the substrates 23 and 24 is in contact with the upper stage 25 or the lower stage 26. Therefore, if there are broken pieces of the substrates 23 and 24 (i.e., pieces of broken glass), foreign matter, etc. on the stages 25 and 26, they cut into the substrates 23 and 24. Consequently, the outer surfaces of the substrates 23 and 24 and further the alignment films placed on the inner sides of the substrates 23 and 24 are damaged, resulting in a tremendous amount of defects. Additionally, the broken pieces of the substrates 23 and 24, foreign matter, etc. cause irregularity in the gap between the substrates 23 and 24, and deterioration of the alignment accuracy in temporarily sticking the substrates 23 and 24 together. Furthermore, since the surfaces of the stages 25 and 26 are also damaged by the foreign matter, etc., troubles occur in the main body of the bonding device and the manufacture of liquid crystal panels.

Embodiment 1

Figure 1:
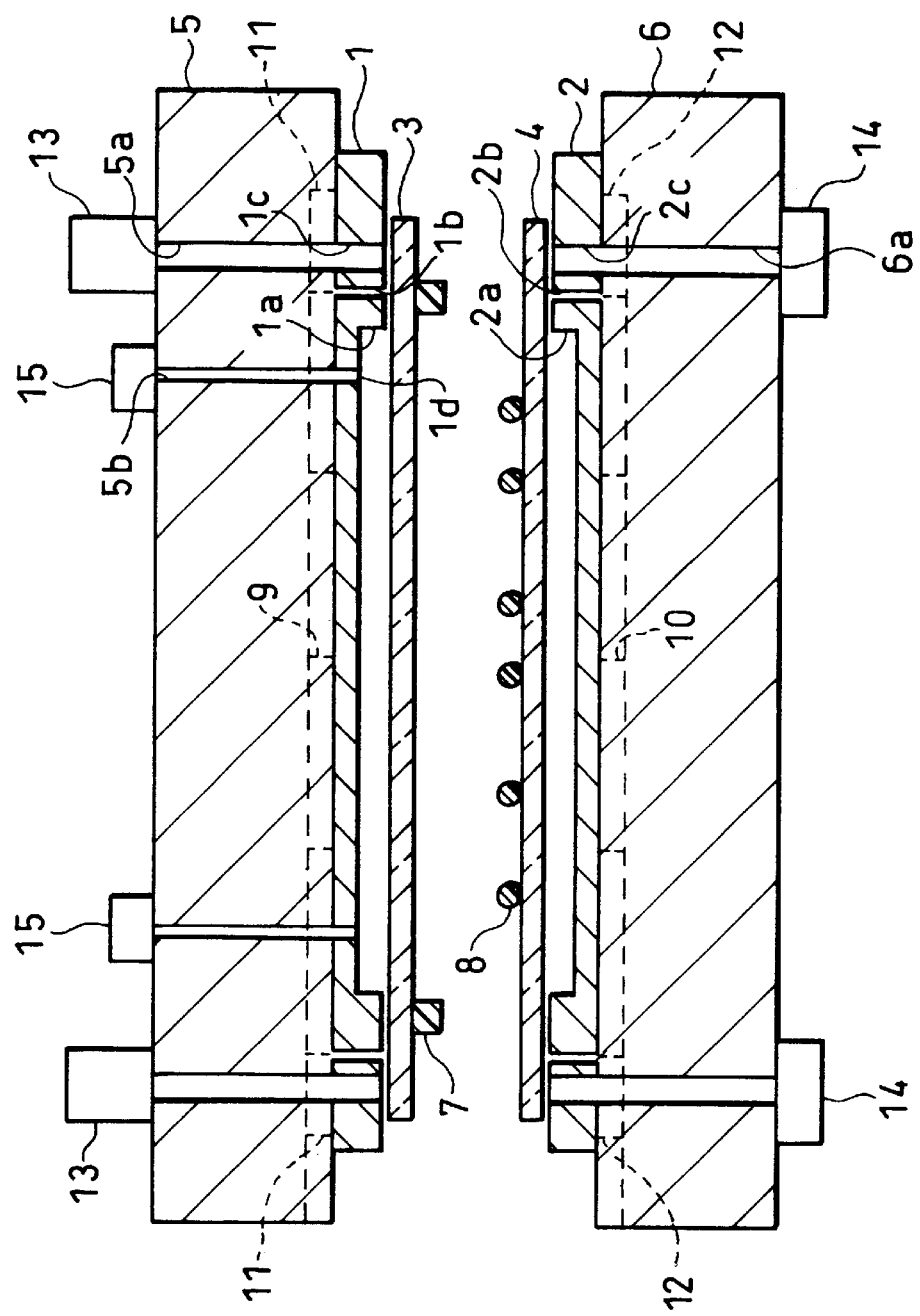
FIG. 1 is a cross sectional view showing a schematic structure of a substrate bonding device according to an embodiment of the present invention.
Figure 2:
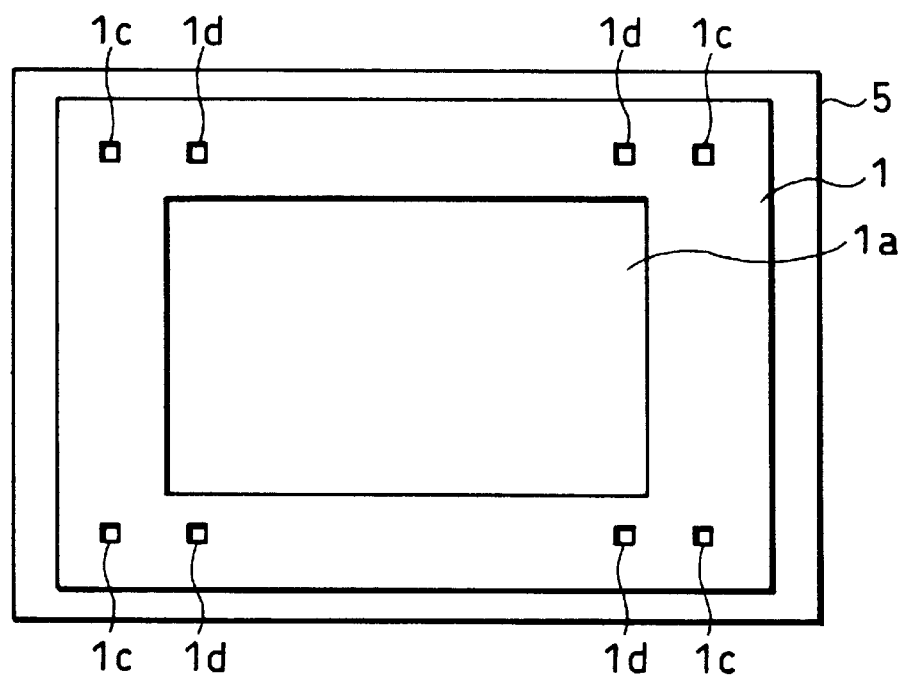
FIG. 2 is a plan view showing a schematic structure of a mask secured to an upper stage.
Figure 3:
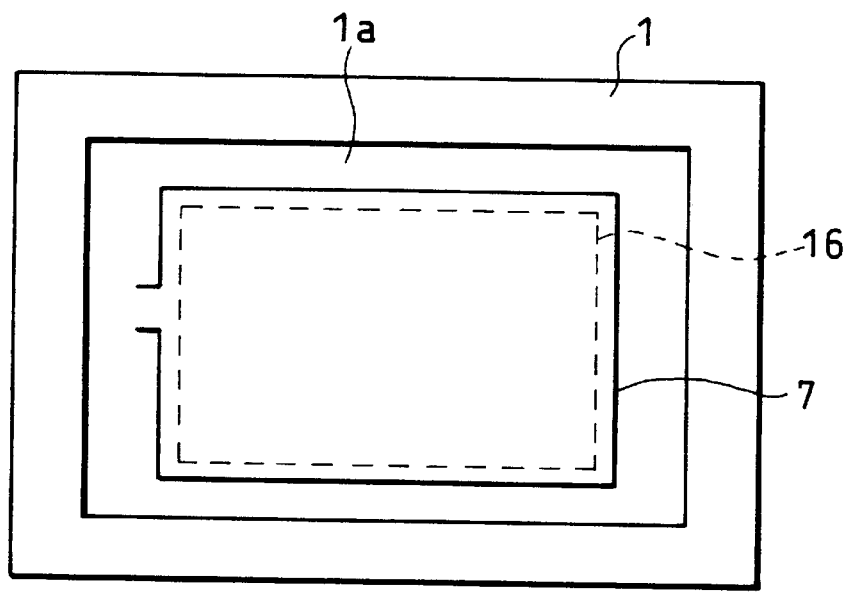
FIG. 3 is a schematic plan view for explaining the relationship between the mask secured to the upper stage shown in FIG. 1 and a liquid crystal display area.

The following description will explain one embodiment of the present invention with reference to FIG. 1 through FIG. 3.

First, referring to FIG. 1, an embodiment of a bonding device for use with a substrate bonding method and a manufacturing method of a liquid crystal display device according to the present invention will be explained. As shown in FIG. 1, the bonding device of this embodiment includes an upper stage (surface plate) 5 and a lower stage (surface plate) 6, which are formed of metal, etc. and have mutually facing parallel flat surfaces. With this bonding device, CF (color filter) substrate 3 and TFT (thin film transistor) substrate 4 (hereinafter occasionally referred to as the substrates 3 and 4) that are positioned one upon another with a seal material (end sealing material) 7 made of a heat-curing type resin and spacers 8 formed of plastic beads therebetween are sandwiched between the upper stage 5 and the lower stage 6 (hereinafter occasionally referred to as the stages 5 and 6) so as to bond them together by pressure.

Specifically, the CF substrate 3 is fabricated by placing a color filter on a glass substrate and coating the color filter with an alignment film or the like. Meanwhile, the TFT substrate 4 is fabricated by placing a thin film transistor as a liquid crystal drive element, pixel electrodes, etc. on a glass substrate and coating them with an alignment film or the like.

The mutually facing flat surfaces of the upper state 5 and lower stage 6 are provided with a number of substrate attracting holes 9 and 10, respectively. The substrate attracting holes 9 are provided to stick and secure the CF substrate 3 to the upper stage 5 by vacuum suction, and connected to a vacuum suction device such as a vacuum pump (not shown) through a conductor in the upper stage 5. Besides, the substrate attracting holes 10 are provided to stick and secure the TFT substrate 4 to the lower stage 6 by vacuum suction, and connected to a vacuum suction device such as a vacuum pump (not shown) through a conductor in the lower stage 6.

Although not shown in the drawings, four alignment marks (alignment-use markers) similar to the alignment marks 23a shown in FIG. 9 are provided in the four corners of the CF substrate 3. Moreover, although not shown in the drawing, the TFT substrate 4 is provided with four alignment marks at positions corresponding to the four alignment marks on the CF substrate 3, respectively.

Furthermore, four alignment-use image pickup holes 5a and four alignment-use image pickup holes 6a are formed to pierce the upper stage 5 and lower stage 6, respectively, at positions corresponding to the alignment marks. Four alignment-use cameras 13 (two of them are not shown) are mounted at positions on the upper stage 5 where the image pickup holes 5a are formed. The cameras 13 perform the function of picking up the images of the alignment marks to recognize whether the positions of the four alignment marks on the CF substrate 3 agree with the positions of the four alignment marks on the TFT substrate 4. Besides, the lower stage 6 is provided with four pieces of backlight 14 (two of them are not shown) as light sources used for picking up the images by the cameras 13 during the alignment.

Four ultraviolet irradiation-use holes 5b are formed at predetermined positions in the four corners of the upper stage 5 so as to pierce the upper stage 5. Moreover, four ultraviolet irradiation light sources 15 (two of them are not shown) for irradiating ultraviolet rays to an ultraviolet-curing type resin applied to four positions on the substrates 3 and 4 are provided at the positions of the upper stage 5 where the ultraviolet irradiation-use holes 5b are formed.

Here, the mount positions of the cameras 13 and backlight 14 may be switched. Furthermore, the ultraviolet irradiation light sources 15 and the ultraviolet irradiation-use holes 5b may be provided on the lower stage 6 instead of the upper stage 5.

The bonding device according to this embodiment is the same as that of the above-mentioned comparative example in the above-described structure, but differs from the bonding device of the comparative example in that masks 1 and 2 prepared by forming recessed sections 1a and 2a at the center part of the flat plates are attached to the stages 5 and 6 so that the recessed sections 1a and 2a face the substrates 3 and 4, respectively. Here, one upper mask 1 is attached to the lower surface of the upper stage 5 and one lower mask 2 is attached to the upper surface of the lower stage 6. However, more than one mask may be attached to one or both of the stages 5 and 6. Besides, the mask may be attached to either the upper surface or the lower surface.

The recessed sections 1a and 2a of the masks 1 and 2 need to have dimensions corresponding to a liquid crystal display area 16, and are preferably in the shape of a rectangle of dimensions slightly larger than the liquid crystal display area 16 as shown in FIG. 3. Hence, by forming the recessed sections 1a and 2a of the masks 1 and 2 in dimensions slightly larger than the liquid crystal display area 16, it is possible to certainly prevent the liquid crystal display area 16 from being scratched. Incidentally, in FIG. 3, in order to simplify the drawing, alignment mark holes 1c and 2c, and ultraviolet irradiation-use through-holes 1d are not shown.

Moreover, as illustrated in FIG. 1, the recessed sections 1a and 2a of the masks 1 and 2 are located on the inner side of the formation area of the seal material 7 of the liquid crystal display device so that the seal member 7 is pressed evenly in a satisfactory manner. However, it is not necessarily that the recessed sections 1a and 2a of the masks 1 and 2 are located on the inner side of the formation area of the seal material 7 as shown in FIG. 3 if the seal material 7 is pressed evenly in a satisfactory manner.

The portions (outer portions) other than the recessed sections 1a and 2a of the masks 1 and 2 are in contact with the substrates 3 and 4, but the recessed sections 1a and 2a are not in contact with the substrates 3 and 4. Therefore, even if there is foreign matter between the masks 1 and 2 and the substrate 3 and 4, since the foreign matter enters into the recessed sections 1a and 2a, it is possible to prevent the foreign matter from being pressed against the substrates 3 and 4. Consequently, the outer surfaces of the substrates 3 and 4 can never be scratched by the foreign matter. Additionally, the alignment films on the inner surfaces of the substrates 3 and 4 can never be scratched by the spacers 8 due to the application of pressure of the foreign matter to the outer surfaces of the substrates 3 and 4. Hence, with the bonding method of this embodiment, the rate of occurrence of defects of the bonded substrates 3 and 4 is limited to a low value by providing the masks 1 and 2. It is therefore possible to improve the yield of the liquid crystal display device.

When the dimensions of the liquid crystal display area 16 is changed due to a change of a liquid crystal display device (liquid crystal display cell pattern) to be produced, it is more preferable to replace the masks 1 and 2 with those having recessed sections 1a and 2a of dimensions corresponding to the size of the liquid crystal display area 16. As a result, the substrates 3 and 4 can be bonded together under bonding conditions optimum for the liquid crystal display device to be manufactured. It is therefore possible to readily meet liquid crystal display devices of various sizes and achieve optimum bonding.

The masks 1 and 2 are made stick and secured to the stages 5 and 6 by vacuum suction. Sticking of the masks 1 and 2 is carried out independently of sticking of the substrates 3 and 4. Besides, the masks 1 and 2 are easily replaceable by cancelling the sticking of the substrates 3 and 4 to the stages 5 and 6. In order to achieve the above-mentioned sticking and securing of the masks 1 and 2 by vacuum suction, mask attracting grooves (mask attracting holes) 11 and 12 as mask attracting vacuum grooves for securing the masks 1 and 2 by vacuum suction are engraved on the mutually facing surfaces of the stages 5 and 6 at positions which are in contact with the masks 1 and 2. The mask attracting grooves 11 and 12 are also connected to a vacuum suction device such as a vacuum pump (not shown).

Through-holes 1b and 2b for sticking the substrates 3 and 4 to the stages 5 and 6 are formed in the masks 1 and 2. The through-holes 1b and 2b are not formed in the liquid crystal display area 16, but are formed at positions corresponding to the substrate attracting holes 9 and 10 in the section other than the recessed sections 1a and 2a. It is therefore possible to stick and secure the substrates 3 and 4 to the stages 5 and 6 through the through-holes 1b and 2b in the masks 1 and 2 by vacuum suction through the substrate attracting holes 9 and 10 formed in the stages 5 and 6. The sticking of the substrates 3 and 4 can be cancelled when withdrawing the substrates 3 and 4. The sticking of the masks 1 and 2 to the stages 5 and 6 is always performed, while the sticking of the substrates 3 and 4 to the stages 5 and 6 is occasionally performed (ON) and cancelled (OFF).

Moreover, as illustrated in FIGS. 1 and 2, positioning-use alignment mark holes (alignment-use through-holes) 1c and 2c are formed in the masks 1 and 2 to pierce the masks 1 and 2 at positions corresponding to the image pickup holes 5a and 6a in the stages 5 and 6. By performing the positioning of the masks 1 and 2 with the use of the alignment mark holes 1c and 2c, the masks 1 and 2 can be secured accurately to the stages 5 and 6.

Furthermore, as illustrated in FIGS. 1 and 2, the ultraviolet irradiation-use through-holes 1d are formed to pierce the mask 1 at positions corresponding to the ultraviolet irradiation-use holes 5b in the upper stage 5. Hence, ultraviolet rays irradiated by the ultraviolet irradiation light sources 15 reach the ultraviolet-curing type resin sandwiched between the substrates 3 and 4 through the irradiation-use holes 5b and the ultraviolet irradiation-use through holes 1d.

Next, the material and dimensions of the masks 1 and 2 will be explained.

The masks 1 and 2 are formed of preferably metal material such as SUS 430 as one kind of ferrite stainless steel and alloy 42, and particularly preferably SUS 430.

It is preferable to set the thickness (thickness of the part other than the recessed sections 1a, 2a) of each of the masks 1 and 2 at a value not more than 1 mm, for example, 0.5 mm or 1 mm. With this setting, the masks 1 and 2 are comparatively light. For instance, the weight of each of the masks 1 and 2 formed of SUS 430 is in the range of around 630 g to around 750 g for a thickness of 0.5 mm, and in the range of around 1260 g to around 1500 g for a thickness of 1 mm. Therefore, the handling of the masks 1 and 2 in the manufacturing process can be improved. Moreover, when the masks 1 and 2 are formed of SUS 430 in a thickness of not more than 1 mm, the costs of the masks 1 and 2 can be limited to relatively low costs.

The depth of each of the recessed sections 1a and 2a of the masks 1 and 2 is preferably set to 50% of the thickness of each of the masks 1 and 2. Accordingly, it is preferable to set the depth of the recessed sections 1a and 2a of the masks 1 and 2 at 0.25 mm when the thickness of each of the masks 1 and 2 is 0.5 mm, and at 0.5 mm when the thickness of each of the masks 1 and 2 is 1 mm. Besides, the area of each of the masks 1 and 2 is normally not more than 1 m$^2$.

Next, the following description will explain one example of the substrate bonding method and manufacturing method of a liquid crystal display device using the above-mentioned bonding device.

According to the manufacturing method of a liquid crystal display device of this embodiment, first, prior to the bonding step, the spacers 8 for keeping the cell gap (the distance between the substrates 3 and 4) uniform are spread on the TFT substrate 4. Moreover, the ultraviolet-curing type resin (not shown) for temporarily sticking the substrates 3 and 4 together is applied to the predetermined positions in the four corners of the substrates 3 and 4. Furthermore, the seal material 7 is formed on the CF substrate 3 by drawing so as to enclose the liquid crystal display area 16. Incidentally, the seal material 7 and the spacers 8 may be provided on either of the substrates 3 and 4.

Subsequently, with the use of the above-mentioned bonding device, the step of bonding the CF substrate 3 and TFT substrate 4 together is performed. More specifically, the substrates 3 and 4 are positioned so that their surfaces coated with the alignment film or the like face each other, and bonded together accurately with the spaces 8 for keeping a uniform cell gap (distance between the substrates 3 and 4) and the seal material 7 for sealing liquid crystals therebetween.

The following description will explain in detail the method of bonding the CF substrate 3 and TFT substrate 4 together.

First, the surfaces of the upper stage 5, lower stage 6, and masks 1 and 2 are cleaned. Next, the masks 1 and 2 are positioned accurately with respect to the stages 5 and 6. Thereafter, the CF substrate 3 is transported to the upper mask 1 by a robot arm (not shown) or the like.

Subsequently, vacuum suction is performed through the through-holes 1b in the mask 1 from the substrate attracting holes 9 to stick the CF substrate 3 to the lower surface of the upper stage 5. At this time, positioning of the CF substrate 3 is performed in advance. Therefore, the position of the CF substrate 3 can never be displaced with respect to the mask 1. Moreover, in the same manner as above, vacuum suction is performed through the through-holes 2b in the mask 2 from the substrate attracting holes 10 to stick the TFT substrate 4 to the upper surface of the lower stage 6.

Then, the lower stage 6 is raised to the vicinity of the upper stage 5. Thereafter, the four alignment marks on the CF substrate 3 and the four alignment marks on the TFT substrate 4 are read by the four cameras 13 through the image pickup holes 5a and alignment mark holes 1c. According to the result of reading, the positioning of the substrates 3 and 4 is performed by adjusting the position of the lower stage 6 so that these alignment marks overlap each other. In this adjustment of the position of the lower stage 6, after performing rough alignment for relatively roughly adjusting the X coordinate and Y coordinate of the lower stage 6 by the (X,Y,θ) drive device (not shown), precise alignment is carried out to raise the lower stage 6 so that the substrates 3 and 4 come closer to each other and accurately and finely adjust the X coordinate and Y coordinate of the lower stage 6.

Subsequently, a constant pressure is applied to the substrates 3 and 4 by the stages 5 and 6 so as to press the substrates 3 and 4. At this time, even if foreign matter, etc. is present between the masks 1 and 2 and the substrates 3 and 4 or between the stages 5 and 6 and the masks 1 and 2, no pressure is applied to the liquid crystal display area 16 because of the recessed sections 1a and 2a of the masks 1 and 2. Consequently, the liquid crystal display area 16 is protected from scratch.

Thereafter, ultraviolet rays are irradiated on the positions between the substrates 3 and 4 where the ultraviolet-curing type resin is applied, by the four ultraviolet irradiation-use light sources 15 through the ultraviolet irradiation-use holes 5b and ultraviolet irradiation-use through-holes id so as to temporarily stick the substrates 3 and 4 together.

Next, the pressure from the stages 5 and 6 is released. In other words, the sticking of the CF substrate 3 to the upper stage 5 is cancelled and blowing of clean air from the substrate attracting holes 9 is carried out to allow easy separation of the substrates 3 and 4 from the upper mask 1. At this time, the TFT substrate 4 on the lower stage 6 remains stuck to the lower stage 6.

Furthermore, after lowering the lower stage 6 to a predetermined position, the sticking of the lower stage 6 to the TFT substrate 4 is cancelled and blowing of clean air from the substrate attracting holes 10 is carried out to allow easy separation of the TFT substrate 4 from the lower mask 2 in the same manner as above. Thereafter, the bonded substrates 3 and 4 are withdrawn by sticking the substrates 3 and 4 to a robot arm (not shown) or the like. Through the above-mentioned process, the bonding step is completed.

After this bonding step, the substrates 3 and 4 are sealed by performing baking for curing the seal material 7, the bonded substrates 3 and 4 are cut in the vicinity of the outer side of the seal material 7, and liquid crystals are introduced and sealed in the space between the bonded substrates 3 and 4 so as to complete a liquid crystal display panel (liquid crystal display device).

As described above, in this embodiment, by providing the masks 1 and 2 that are prepared by forming the recessed sections 1a and 2a at the center part of the flat plates on the stages 5 and 6 so that the recessed sections 1a and 2a face the substrates 3 and 4, respectively, the following effects are obtained.

Specifically, first, the presence of the recessed sections 1a and 2a in the masks 1 and 2 prevent the outer surface of the substrates 3 and 4 (the glass substrate surfaces) from being scratched by foreign matter, etc. Moreover, since local pressure due to foreign matter, etc. is not applied to the outer surfaces of the substrates 3 and 4, not only the outer surfaces of the substrates 3 and 4, but also the inner surfaces of the substrates 3 and 4 where the alignment films, etc. are formed are not damaged. Furthermore, it is possible to prevent the stages 5 and 6 from being scratched by foreign matter, etc. In addition, the gap between the bonded substrates 3 and 4 is not decreased by the effect of the foreign matter, and is thus kept uniform.

Besides, in this embodiment, since a pair of masks 1 and 2 are placed on the stages 5 and 6, respectively, it is possible to prevent both of the surfaces of each of the substrates 3 and 4 from being scratched and also prevent the stages 5 and 6 from being scratched by foreign matter, etc. Moreover, since the dimensions of the recessed sections 1a and 2a can be readily changed by replacing the masks 1 and 2, this embodiment can readily meet liquid crystal display devices having a liquid crystal display area of a variety of dimensions.

Furthermore, in this embodiment, since the masks 1 and 2 and the substrates 3 and 4 are secured to the stages 5 and 6 by vacuum suction, it is possible to more uniformly keep the distance between the bonded substrates 3 and 4 and further improve the alignment accuracy of the substrates 3 and 4.

Besides, as described above, in the substrate bonding device of this embodiment, it is possible to easily mechanize and completely automate the bonding operation by the use of a robot arm or the like. As a result, the yield in the bonding process can be significantly improved, and the costs in the bonding process can be reduced.

Embodiment 2

Figure 4:
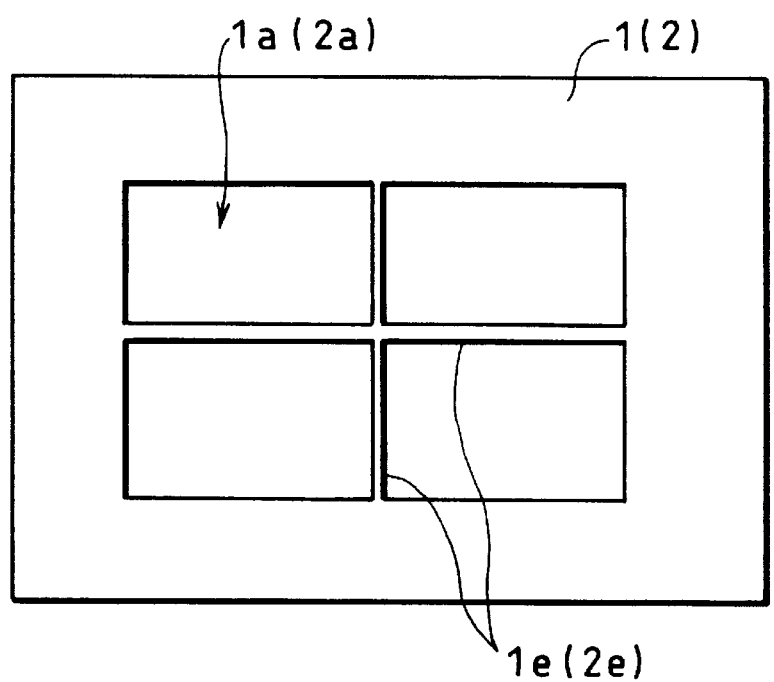
FIG. 4 is a plan view showing a schematic structure of a mask according to another embodiment of the present invention.

Referring to FIGS. 4, 5(*a*) and 5(*b*), the following description will explain another embodiment of the present invention. For the sake of explanation, the members having the same functions as those in EMBODIMENT 1 will be designated by the same codes and the explanation thereof will be omitted.

According to a substrate bonding method and a manufacturing method of a liquid crystal display device of this embodiment, bonding is carried out in the same manner as the bonding method and manufacturing method of a liquid crystal display device of EMBODIMENT 1 except that the masks 1 and 2 shown in FIG. 4 are used instead of the masks 1 and 2 shown in FIGS. 1 and 2. Note that the expression "1(2)" in the drawings means that the member is used as either "1" or "2".

As shown in FIG. 4, the masks 1 and 2 used in this embodiment are obtained by providing the masks 1 and 2 shown in FIGS. 1 and 2 with ribs (supports) 1e and 2e as protruding sections in the recessed sections 1a and 2a. Here, in order to simplify the drawing, the alignment mark holes 1c and 2c and ultraviolet irradiation-use through-holes 1d are not illustrated.

The ribs 1e and 2e include ribs 1e and 2e running in a longitudinal direction of the masks 1 and 2 to pass through the center of the masks 1 and 2, and ribs 1e and 2e running in a cross direction to pass through the center of the masks 1 and 2 (a direction that is parallel to the plane of the masks 1 and 2 and crosses the longitudinal direction of the masks 1 and 2 at right angles).

The ribs 1e and 2e are fabricated such that their height (dimension along the direction of the thickness of the masks 1 and 2) is equal to the thickness of each of the masks 1 and 2. Accordingly, it is possible to certainly prevent the substrates 3 and 4 from being warped toward the recessed sections 1a and 2a. The dimensions of the ribs 1e and 2e in the other directions can be selected from a variety of choices and are not particularly limited. For example, the width of each of the ribs 1e and 2e in the direction parallel to the plane of the masks 1 and 2 is set at 5 mm.

It is preferable to form the ribs 1e and 2e by the same material as that used for other part of the masks 1 and 2. Accordingly, the ribs 1e and 2e and the recessed sections 1a and 2a can be formed simultaneously. In other words, the ribs 1e and 2e are not formed after the formation of the recessed sections 1a and 2a, but can be formed by etching at the time when the recessed sections 1a and 2a are formed by etching.

Even when the sizes of the recessed sections 1a and 2a (or the size of the liquid crystal display area 16) are increased, if the ribs 1e and 2e are provided in this manner, it is possible to prevent the warpage of the substrates 3 and 4 and maintain the flatness of the substrates 3 and 4 in the stable manner.

Additionally, in this embodiment, although the contact area of the substrates 3 and 4 and the masks 1 and 2 are slightly larger than those in EMBODIMENT 1 because of the contact of the ribs 1e and 2e with the substrates 3 and 4, they are smaller than those in the method of the comparative example. It is therefore possible to reduce the amount of broken pieces of glass, foreign matter, etc., sandwiched between the substrates 3 and 4 and the press surfaces, thereby decreasing the amount of scratches produced on the surfaces of the substrates 3 and 4.

Figure 5A:
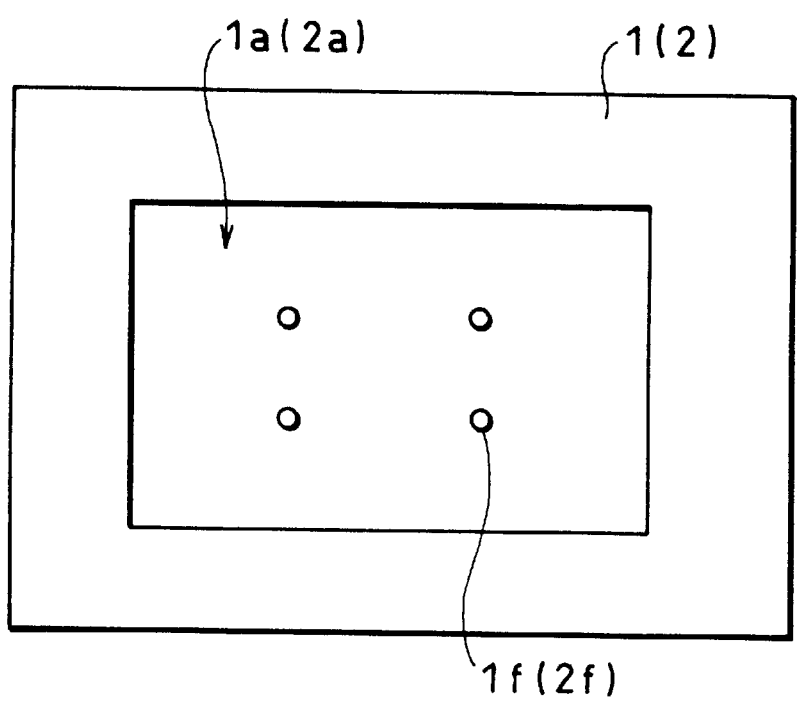
FIG. 5(a) is a plan view showing a schematic structure of a mask according to still another embodiment of the present invention.
Figure 5B:
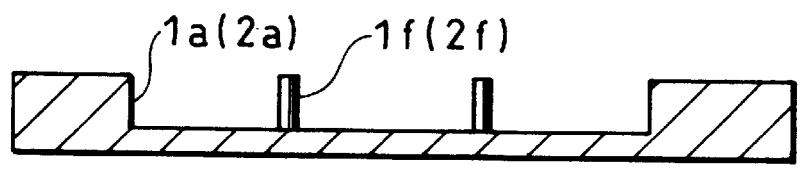
FIG. 5(b) is a cross sectional view showing a schematic structure of a mask according to still another embodiment of the present invention.

Besides, it is possible to obtain the same effects as the masks 1 and 2 shown in FIG. 4 by using masks 1 and 2 having supports 1f and 2f as protruding sections as shown in FIGS. 5(a) and 5(b) instead of using the masks 1 and 2 having the structure shown in FIG. 4. In FIGS. 5(a) and 5(b), in order to simplify the drawings, the alignment marks 1c and 2c and ultraviolet irradiation-use through-holes 1d are not illustrated.

The supports 1f and 2f include four supports 1f extended in a direction perpendicular to the mask 1 and four supports 2f extended in a direction perpendicular to the mask 2e, respectively. The supports 1f and 2f are arranged to pass through the middle point of the lines connecting the center of the masks 1 and 2 to the four corners of the recessed sections 1a and 2a.

The supports 1f and 2f are also formed such that their height (dimension along the direction of thickness of the masks 1 and 2) is equal to the thickness of each of the masks 1 and 2. Accordingly, it is possible to certainly prevent the substrates 3 and 4 from being warped toward the recessed sections 1a and 2a. The shape and diameter of each of the supports 1f and 2f can be selected from a variety of choices and are not particularly limited. For example, each of the supports 1f and 2f can have a cylindrical shape with a diameter of 1 mm.

It is preferable to form the supports 1f and 2f by the same material as that used for other part of the masks 1 and 2. Accordingly, the supports 1f and 2f are not formed after the formation of the recessed sections 1a and 2a, but can be formed at the time when the recessed sections 1a and 2a are formed by etching.

Embodiment 3

Figure 6:
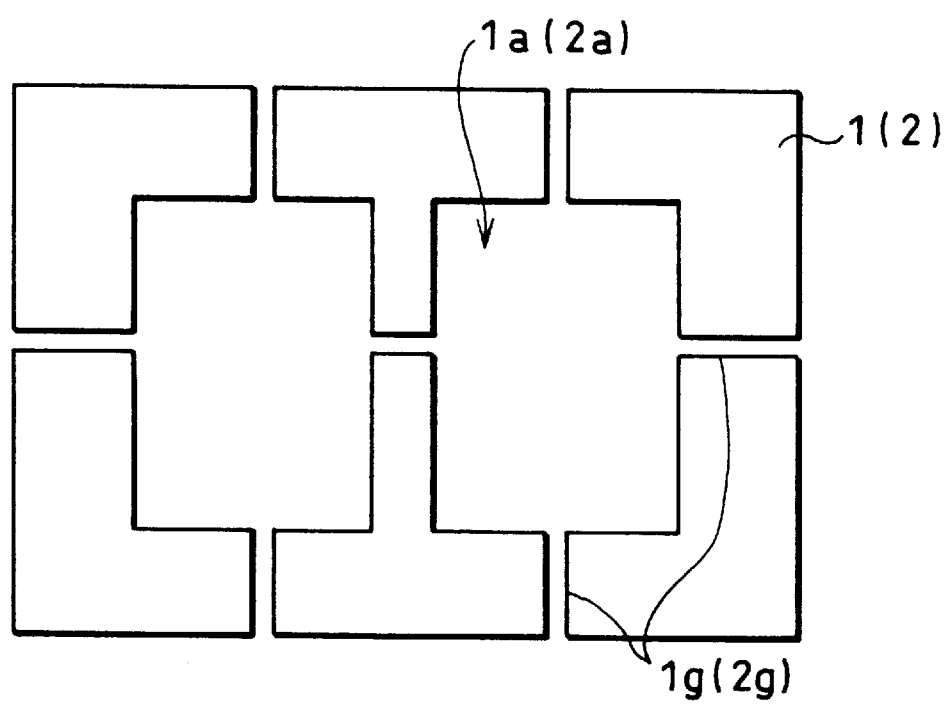
FIG. 6 is a plan view showing a schematic structure of a mask according to still another embodiment of the present invention.

Referring to FIG. 6, the following description will explain another embodiment of the present invention. For the sake of explanation, the members having the same functions as those in EMBODIMENT 1 will be designated by the same codes and the explanation thereof will be omitted.

According to a substrate bonding method and a manufacturing method of a liquid crystal display device of this embodiment, bonding is carried out in the same manner as the bonding method and manufacturing method of a liquid crystal display device of EMBODIMENT 1 except that the masks 1 and 2 shown in FIG. 6 are used instead of the masks 1 and 2 shown in FIGS. 1 and 2.

As shown in FIG. 6, the masks 1 and 2 used in this embodiment are prepared by providing the masks 1 and 2 shown in FIGS. 1 and 2 with leak grooves 1g and 2g for ventilating air between the recessed sections 1a and 2a and the side surfaces of the masks 1 and 2 in the recessed sections 1a and 2a. Here, in order to simplify the drawing, the alignment marks 1c and 2c and ultraviolet irradiation-use through-holes 1d are not illustrated.

According to the bonding method and manufacturing method of a liquid crystal display device of EMBODIMENT 1, there is a possibility that leakage of vacuum suction (vacuum leakage), i.e., vacuum suction from the substrate attracting holes 9 and 10 formed at positions opposite to the outer edges (the periphery of the recessed sections 1a and 2a) of the masks 1 and 2 on the stages 5 and 6 acts on the recessed sections 1a and 2a through slight spaces between the substrates 3 and 4 and the masks 1 and 2 during the sticking of the substrates 3 and 4 to the stages 5 and 6. When such leakage of vacuum suction occurs, the recessed sections 1a and 2a are brought into a reduced pressure state, and the substrates 3 and 4 are warped toward the recessed sections 1a and 2a or are not separated from the masks 1 and 2.

On the other hand, according to the bonding method and manufacturing method of a liquid crystal display device of this embodiment, since the leak grooves 1g and 2g for ventilating air between the recessed sections 1a and 2a and the side surfaces of the masks 1 and 2 are provided in the recessed sections 1a and 2a, even when the leakage of vacuum suction acts on the recessed sections 1a and 2a, outside air flows into the recessed sections 1a and 2a from the side surfaces of the masks 1 and 2 through the leak grooves 1g and 2g. It is therefore possible to prevent the recessed sections 1a and 2a from being brought into a reduced pressure state, and keep a normal pressure in the recessed sections 1a and 2a. Hence, it is possible to prevent such problems that the substrates 3 and 4 are warped toward the recessed sections 1a and 2a and the substrates 3 and 4 can not be separated from the masks 1 and 2.

Embodiment 4

Figure 7:
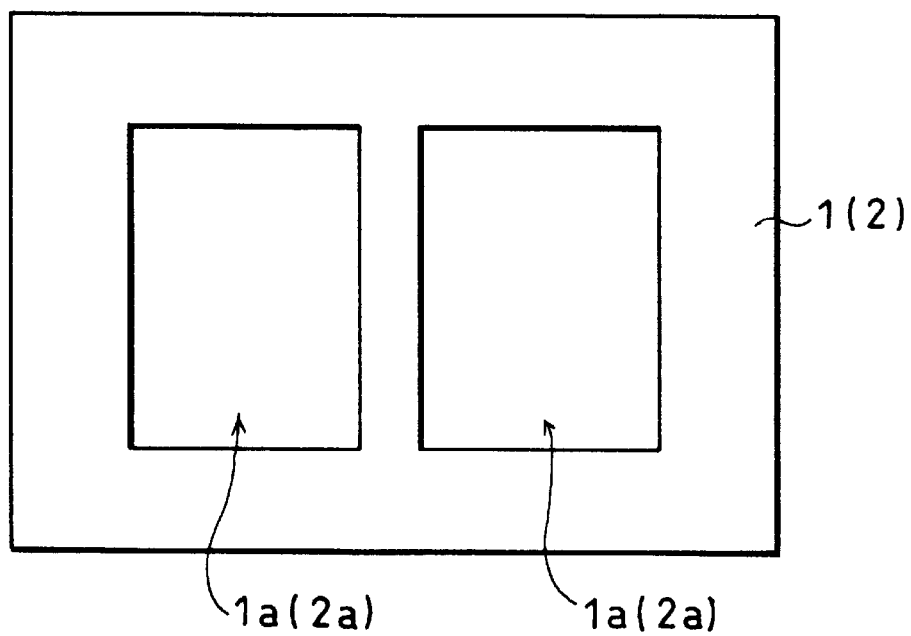
FIG. 7 is a plan view showing a schematic structure of a mask according to still another embodiment of the present invention.

Referring to FIG. 7, the following description will explain another embodiment of the present invention. For the sake of explanation, the members having the same functions as those in EMBODIMENT 1 will be designated by the same codes and the explanation thereof will be omitted.

According to a substrate bonding method and a manufacturing method of a liquid crystal display device of this embodiment, bonding is carried out in the same manner as the bonding method and manufacturing method of a liquid crystal display device of EMBODIMENT 1 except that the masks 1 and 2 shown in FIG. 7 are used instead of the masks 1 and 2 shown in FIGS. 1 and 2.

As shown in FIG. 7, the mask 1 used in this embodiment includes a plurality of recessed sections 1a. Similarly, the mask 2 has a plurality of recessed sections 2a as shown in FIG. 7.

According to the this method, a plurality of regions protected by the recessed sections 1a and 2a are obtained in the bonded substrates 3 and 4. Therefore, even when a plurality of liquid crystal display devices are produced, i.e., when so-called multiple panels are obtained, from the bonded substrates 3 and 4, it is possible to provide each liquid crystal display panel with the liquid crystal display area 16 having no scratch by providing the regions protected by the recessed sections 1a and 2a as the liquid crystal display area 16 of the liquid crystal display devices.

Incidentally, in the above-mentioned embodiments, although a mask (1 or 2) is placed on both of the upper stage 5 and lower stage 6, it is possible to provide a mask only on the upper stage 5 (i.e., omit the mask 2) or provide a mask only on the lower stage 6 (i.e., omit the mask 1).

Moreover, each of the above-mentioned embodiment explains a heat-curing type bonding device that uses a heat-curing type resin as the seal material 7 and temporarily sticks the substrates together by using an ultraviolet-curing type resin. However, the present invention is applicable to an ultraviolet-curing type bonding device that uses an ultraviolet-curing type resin as the seal material 7 and a light transmitting material (for example, quartz) for the upper stage 5 and lower stage 6.

Furthermore, each of the above-mentioned embodiments explains the present invention by illustrating an example in which the present invention is applied to the bonding of the CF substrate 3 and the TFT substrate 4 for the manufacture of a TFT type liquid crystal display device. However, the present invention is applicable to all of the bonding processes of substrates such as glass plates irrespective of the type of a device to be manufactured, for example, the liquid crystal drive method. Therefore, the substrate bonding method and bonding device of the present invention are applicable to the bonding of upper and lower substrates for the manufacture of an STN type liquid crystal display device, and the manufacturing method of a liquid crystal display device of the present invention is applicable to the manufacture of an STN type liquid crystal display device. Additionally, the substrate bonding method and bonding device of the present invention are applicable not only to the manufacture of a liquid crystal display device, but also to the bonding of substrates of other device.

Thus, the first object of the present invention is to provide a substrate bonding method and a manufacturing method of a liquid crystal display device that can readily meet the manufacture of bonded substrates of a variety of dimensions. Moreover, the second object of the present invention is to provide a substrate bonding method and a manufacturing method of a liquid crystal display device that can keep the flatness of the substrate in a stable manner even when the size of the recessed section is increased. Furthermore, the third object of the present invention is to provide a substrate bonding method and bonding device and a manufacturing method of a liquid crystal display device that can keep the distance between the bonded substrates uniform and improve the alignment accuracy of the substrates.

The substrate bonding method of the present invention is a substrate bonding method for positioning a pair of substrates one upon another and sandwiching the substrates between a pair of mutually facing surface plates to bond the substrates together, and characterized by providing a pair of masks, each of which was prepared by forming a recessed section at the center part of a flat plate, on the surface plates so that the recessed sections face the substrates, respectively.

According to this method, since the mask is provided with the recessed section, the surface at the central part of the substrate that faces the recessed section is not in contact with the mask. Therefore, in a region where the recessed section of the mask faces the substrate, even if there are broken pieces of the substrate, foreign matter, etc. between the mask and the substrate, the broken pieces of the substrate, foreign matter, etc. come into the recessed section of the mask. Consequently, it is possible to prevent a local pressure due to the broken pieces, foreign matter, etc. from being applied to the outer surface of the substrate facing the recessed section of the mask. It is thus possible to prevent the outer surface of the substrate facing the recessed section of the mask from being scratched. In other words, it is possible to protect the outer surface of the substrate from foreign matter, etc. by the recessed section of the mask.

Moreover, when manufacturing a liquid crystal display device using bonded substrates, in general, spacers formed of plastic beads are placed on the inner side of the substrate. In this case, if a local pressure is applied to the outer surface of the substrate, the broken pieces of the substrate, foreign matter, etc. are pressed against the spacers and the inner surface of the substrate is scratched. However, according to the above method, since no local pressure is applied to the outer surface of the substrate facing the recessed section of the mask, it is possible to prevent scratches on the inner surface of the substrate at this portion.

Accordingly, for example, if a liquid crystal display device is manufactured by using the portion of the bonded substrates, which is protected by the recessed section of the mask, it is possible to prove the liquid crystal display device having a display screen (display area) with no scratches.

Furthermore, according to the above method, since the contact area between the mask and the substrate surface is reduced, it is possible to decrease the amount of foreign matter, etc. sandwiched between the substrate and the mask. Consequently, the amount of scratches produced on the mask surface can be reduced.

Besides, according to the above method, in a region where the substrate and the recessed section of the mask face each other, foreign matter, etc. are not sandwiched between the outer surface of the substrate and the press surface, and thus the distance (gap) between the substrates can never be locally decreased by the effects of the sandwiched foreign matter, etc. It is therefore possible to keep the distance between the substrates uniform and provide bonded substrates having a uniform gap.

In addition, according to the above method, since a pair of masks are placed on the surface plates, respectively, it is possible to prevent not only the surface of each substrate from being scratched, but also each of the surface plates from being scratched. Furthermore, since the dimensions of the recessed section can be easily changed by replacing the mask, the above method can readily meet bonded substrates of a variety of dimensions, such as liquid crystal display devices having liquid crystal display areas of a variety of dimensions.

Besides, the substrate bonding method of the present invention is a substrate bonding method for positioning a pair of substrates one upon another and sandwiching the substrates between a pair of mutually facing surface plates to bond the substrates together, and may include placing a mask, which was prepared by forming a recessed section at the center part of a flat plate and forming a protruding section in the recessed section, on at least one of the surface plates so that the recessed section faces the substrate.

According to this method, since the mask is provided with the recessed section, like the above-mentioned method, it is possible to prevent the inner surface and outer surface of the substrate from being scratched and also prevent the mask surface from being scratched, and provide bonded substrates with a uniform gap.

Moreover, it is preferable that the height of the protruding section is equal to the thickness of the mask.

According to this method, since the protruding section is provided in the recessed section facing the substrate, even if a force for bending the substrate toward the recessed section is applied when sandwiching the substrates with the pair of surface plates, it is possible to prevent deformation of the substrate by the protruding section. Consequently, even when the size of the recessed section is increased, it is possible to prevent the substrate from being warped toward the recessed section and maintain the flatness of the substrate in a stable manner.

Besides, the substrate bonding method of the present invention is a substrate bonding method for positioning a pair of substrates one upon another and sandwiching the substrates between a pair of mutually facing surface plates to bond the substrates together, and may provide a mask, which was prepared by forming a recessed section at the center part of a flat plate and forming through-holes at parts other than the recessed section, on at least one of the surface plates so that the recessed section faces the substrate and perform vacuum suction from substrate attracting holes formed in the surface plate so as to stick and secure the substrate to the surface plate through the through-holes in the mask.

According to this method, since the mask is provided with the recessed section, like the above-mentioned method, it is possible to prevent the inner surface and outer surface of the substrate from being scratched and also prevent the mask surface from being scratched, and provide bonded substrates with a uniform gap.

Moreover, according to this method, by securing the substrate to the surface plate through the mask, it is possible to maintain the distance between the bonded substrates uniform and improve the alignment accuracy of the substrates.

In such a method of sticking and securing the substrates to the surface plates, it is preferable to provide the mask with leak grooves for ventilating air between the recessed section and the side surface of the mask.

Accordingly, even when leakage of vacuum suction (vacuum leakage) for sticking the substrate to the surface plate acts on the recessed section, since outside air flows into the recessed section from the side surface of the mask through the leak grooves, it is possible to prevent the recessed section from being brought into a reduced pressure state. It is therefore possible to prevent such problems that the substrate is pulled and warped toward the recessed section due to the reduced pressure in the recessed section.

Additionally, in the above-mentioned methods, it is preferable that the mask is formed of a metal material. In this case, since the mask is formed of a metal material, it has higher strength and durability compared with thick paper. It is therefore possible to bond the substrates in a stable manner in a long period of time.

Furthermore, according to this method, since the mask is formed of a metal material, when sticking the mask to the surface plate by attracting the mask through the holes formed in the surface plate by vacuum suction, it is possible to limit the leakage of vacuum suction to a low level. It is therefore possible to secure the mask more firmly and further improve the uniformity of the distance between the substrates and the alignment accuracy.

Besides, in the above-mentioned methods, the mask may include a plurality of recessed sections.

In this case, it is possible to provide bonded substrates having a plurality of regions protected by the recessed sections. Therefore, for example, when a plurality of liquid crystal display devices are produced, i.e., so-called multiple panels are obtained, from a pair of bonded substrates, it is possible to provide each liquid crystal display device with a liquid crystal display area having no scratch by serving the regions protected by the recessed sections as the display area of the liquid crystal display devices.

The substrate bonding device of the present invention is a substrate bonding device for bonding a pair of substrates positioned one upon another, and includes: a pair of mutually facing surface plates for sandwiching the substrates; a mask placed at least one of the surface plates; a recessed section formed at the center part of a mask surface facing the substrate; through-holes formed at parts of the mask other than the recessed section; substrate attracting holes for securing the substrate by vacuum suction, the substrate attracting holes being formed in the mutually facing surfaces of the surface plates at positions corresponding to the through-holes; and mask attracting holes for securing the mask by vacuum suction, the mask attracting holes being formed in the mutually facing surfaces of the surface plates at positions which are in contact with the mask.

According to this method, the presence of the recessed section in the mask protects the outer surface of the substrate from being scratched by foreign matter, etc. and also prevents the inner surface of the substrate from being scratched due to the application of a local pressure to the outer surface of the substrate, and reduces the amount of scratches to be produced on the mask surface. In addition, it is possible to prevent foreign matter, etc. from being sandwiched between the outer surface of the substrate and the press surface, and maintain the distance between the bonded substrates more uniformly.

According to this structure, it is possible to secure the substrate to the surface plate through the through-holes in the mask and secure the mask to the surface plate by vacuum suction through the mask attracting holes. Therefore, the uniformity of the distance between the substrates and the alignment accuracy of the substrate can be further improved.

A manufacturing method of a liquid crystal display device of the present invention includes, after bonding a pair of substrates together by using any one of the above-mentioned methods, introducing liquid crystals between the substrates.

According to this method, by bonding a pair of substrates together by using a method of placing a pair of masks on the surface plates, respectively, the method can readily meet the manufacture of liquid crystal display devices with a liquid crystal display area of a variety of dimensions. Moreover, by bonding a pair of substrates together by using a method of providing the protruding section in the recessed section facing the substrate, it is possible to maintain the flatness of the substrate in a stable manner even when the size of the recessed section is increased. Furthermore, by bonding a pair of substrates together by using a method of sticking and securing the substrate to the surface plate by vacuum suction through the through-holes in the mask, it is possible to maintain the distance between the bonded substrates uniform and improve the alignment accuracy of the substrates.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A substrate bonding method comprising:
   securing a pair of masks, each having a recessed section at a center part thereof, on a pair of mutually facing surface plates by applying vacuum suction through substrate attracting holes in the surface plates so that the recessed sections of the masks face each other;
   sandwiching a pair of substrates positioned one upon another between the surface plates with the masks therebetween so as to sandwich an ultraviolet-curing resin between the substrates; and
   irradiating the ultraviolet-curing resin through ultraviolet irradiation-use through-holes formed in at least one of the surface plates and the corresponding mask which is secured to the surface plate, so as to bond the substrates together.

2. The substrate bonding method as set forth in claim 1, wherein the masks are formed of a metal material.

3. The substrate bonding method as set forth in claim 1, wherein the masks are provided with a plurality of recessed sections.

4. The method as set forth in claim 1, further comprising the step of:
   placing a mask, which was prepared by forming a protruding section in the recessed section, on at least one of the pair of mutually facing surface plates.

5. The substrate bonding method as set forth in claim 4, wherein the protruding section is formed to have a height equal to a thickness of the mask.

6. The substrate bonding method as set forth in claim 4, wherein the mask is formed of a metal material.

7. The substrate bonding method as set forth in claim 4, wherein the mask is provided with a plurality of recessed sections.

8. The substrate bonding method as set forth in claim 1, wherein alignment marks on the substrates are read by cameras through image pickup holes, which pierce the surface plates, and alignment mark holes, which are formed in the masks so as to pierce the masks at positions corresponding to the image pickup holes, so that positioning the substrates is performed according to a result of the camera reading, and the substrates are sandwiched between the surface plates.

9. A substrate bonding method comprising:
   securing a mask, having a recessed section at a center part thereof and substrate sticking-use through-holes at parts other than the recessed section, on at least one of a pair of mutually facing surface plates by applying vacuum suction through substrate attracting holes in at least one surface plate so that the recessed section of the mask faces the other surface plate;
   sticking and securing a substrate to the surface plate having a mask secured thereon through the substrate sticking-use through-holes in the mask by applying vacuum suction through substrate attracting holes formed in the surface plate;
   sandwiching the substrate and a second substrate positioned one upon another between the surface plates with the mask therebetween so as to sandwich an ultraviolet-curing resin between the substrates; and
   irradiating the ultraviolet-curing resin through ultraviolet irradiation-use through-holes formed in at least one of the surface plates and the mask, so as to bond the substrates together.

10. The substrate bonding method as set forth in claim 9, wherein the mask is provided with leak grooves for ventilating air between the recessed section and a side surface of the mask.

11. The substrate bonding method as set forth in claim 9, wherein the mask is formed of a metal material.

12. The substrate bonding method as set forth in claim 9, wherein the mask is provided with a plurality of recessed sections.

13. The substrate bonding method as set forth in claim 9, wherein alignment marks on the substrates are read by cameras through image pickup holes, which pierce the surface plates, and alignment mark holes, which are formed in the mask so as to pierce the mask at positions corresponding to the image pickup holes, so that positioning the substrates is performed according to a result of the camera reading, and the substrates are sandwiched between the surface plates.

14. A substrate bonding device comprising:
    a pair of mutually facing surface plates for sandwiching a pair of substrates positioned one upon another; and
    a mask placed on at least one of the surface plates,
    wherein the mask includes a recessed section formed at a center part of its surface facing the substrate and substrate sticking-use through-holes at parts other than the recessed section, and
    wherein mutually facing surfaces of the surface plates includes substrate attracting holes for securing the substrate to the surface plate by vacuum suction at positions corresponding to the substrate sticking-use through-holes, and mask attracting holes for securing the mask to the surface plate by vacuum suction at positions in contact with the mask, and
    wherein the surface plate and the mask are provided with ultraviolet irradiation-use through-holes for irradiating a ultraviolet-curing resin on the substrate.

15. The substrate bonding device as set forth in claim 14, wherein the mask has a protruding section in the recessed section.

16. The substrate bonding device as set forth in claim 15, wherein the protruding section is formed to have a height equal to a thickness of the mask.

17. The substrate bonding device as set forth in claim 14, wherein the mask has a plurality of recessed sections.

18. The substrate bonding device as set forth in claim 14, wherein the mask has leak grooves for ventilating air between the recessed section and a side surface of the mask.

19. The substrate bonding device as set forth in wherein the mask is formed of a metal material.

20. The substrate bonding device as set forth in claim 14, wherein the surface plate is provided with image pickup holes, which pierce the surface plate, and the mask is provided with alignment mark holes, which pierce the mask at positions corresponding to the image pickup holes so that alignment marks on the substrate can be read.

21. The substrate bonding device as set forth in claim 14, wherein the recessed section has a depth half a thickness of the mask.

22. A manufacturing method of a liquid crystal display device, comprising:

securing a pair of masks, each having a recessed section at a center part thereof, on a pair of mutually facing surface plates by applying vacuum suction through substrate attracting holes in the surface plates so that the recessed sections of the masks face each other;

sandwiching a pair of substrates positioned one upon another between the surface plates with the masks therebetween so as to sandwich an ultraviolet-curing resin between the substrates;

irradiating the ultraviolet-curing resin through ultraviolet irradiation-use through-holes formed in at least one of the surface plates and the mask which is secured to the surface plate, so as to bond the substrates together; and introducing liquid crystals between the substrates.

23. The manufacturing method of a liquid crystal display device as set forth in claim 22, wherein the masks are formed of a metal material.

24. The manufacturing method of a liquid crystal display device as set forth in claim 22, wherein the masks have a plurality of recessed sections.

25. The method as set forth in claim 22, further comprising the step of:

placing a mask, which was prepared by forming a protruding section in the recessed section, on at least one of the pair of mutually facing surface plates.

26. The manufacturing method of a liquid crystal display device as set forth in claim 25, wherein the protruding section is formed to have a height equal to a thickness of the mask.

27. The manufacturing method of a liquid crystal display device as set forth in claim 25, wherein the mask is formed of a metal material.

28. The manufacturing method of a liquid crystal display device as set forth in claim 25, wherein the mask has a plurality of recessed sections.

29. The substrate bonding method as set forth in claim 22, wherein alignment marks on the substrates are read by cameras through image pickup holes, which pierce the surface plates, and alignment mark holes, which are formed in the masks so as to pierce the masks at positions corresponding to the image pickup holes, so that positioning the substrates is performed according to a result of the camera reading, and the substrates are sandwiched between the surface plates.

30. The manufacturing method of a liquid crystal display device as set forth in claim 22, wherein the substrates are bounded together with the masks, each of which are provided with the recessed section having dimensions corresponding to a liquid crystal display area of the liquid crystal display device.

31. A manufacturing method of a liquid crystal display device, comprising:

securing a mask, having a recessed section at a center part thereof and substrate sticking-use through-holes at parts other than the recessed section, on at least one of a pair of mutually facing surface plates by applying vacuum suction through substrate attracting holes in the surface plate so that the recessed section of the mask faces the other surface plate;

sticking and securing the substrate to the surface plate through the substrate sticking-use through-holes in the mask by performing vacuum suction from substrate attracting holes formed in the surface plate;

sandwiching the pair of substrates positioned one upon another between the surface plates with the mask therebetween so as to sandwich an ultraviolet-curing resin between the substrates; and irradiating the ultraviolet-curing resin through ultraviolet irradiation-use through-holes formed in at least one of the surface plates and the mask secured to the surface plate, so as to bond the substrates together; and introducing liquid crystals between the substrates.

32. The manufacturing method of a liquid crystal display device as set forth in claim 31, wherein the mask has leak grooves for ventilating air between the recessed section and a side surface of the mask.

33. The manufacturing method of a liquid crystal display device as set forth in claim 31, wherein the mask is formed of a metal material.

34. The manufacturing method of a liquid crystal display device as set forth in claim 31, wherein the mask has a plurality of recessed sections.

35. The substrate bonding method as set forth in claim 31, wherein alignment marks on the substrates are read by cameras through image pickup holes, which pierce the surface plates, and alignment mark holes, which are formed in the mask so as to pierce the mask at positions corresponding to the image pickup holes, so that positioning the substrates is performed according to a result of the camera reading, and the substrates are sandwiched between the surface plates.

36. The manufacturing method a liquid crystal display device as set forth in claim 31, wherein the substrates are bounded together with the mask which is provided with the recessed section having dimensions corresponding to a liquid crystal display area of the liquid crystal display device.

* * * * *